(No Model.)
S. S. SMITH.
Nut Lock.
No. 235,708.    Patented Dec. 21, 1880.
Fig. 1.    Fig. 2.
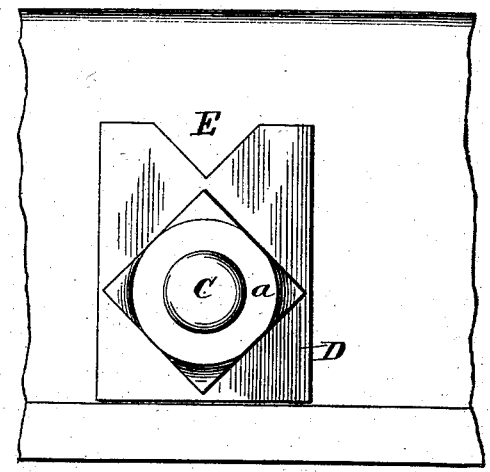
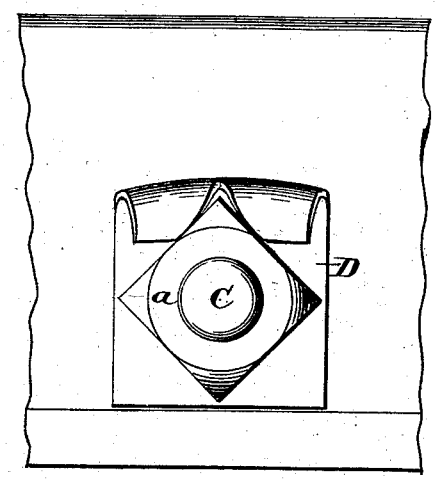
Fig. 3.
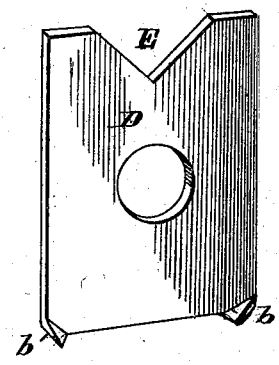
Fig. 4.
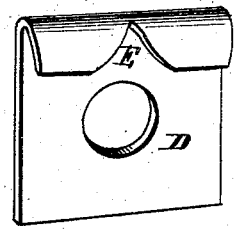
Witnesses.
A. Ruppert.
Jas. J. Lange.
Samuel S. Smith.
Inventor.
per
Edson Brothers
Attorneys.

UNITED STATES PATENT OFFICE.

SAMUEL S. SMITH, OF BRYAN, OHIO, ASSIGNOR OF ONE-FOURTH TO FREDERICK YUNCK, OF SAME PLACE.

NUT-LOCK.

SPECIFICATION forming part of Letters Patent No. 235,708, dated December 21, 1880.

Application filed September 16, 1880. (No model.)

*To all whom it may concern:*

Be it known that I, SAMUEL S. SMITH, of Bryan, in the county of Williams and State of Ohio, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a side view of my invention as applied to a railroad-rail. Fig. 2 is a side view, also, with the upper notched portion of the locking-plate bent down to receive one corner of the nut on the securing-bolt; and Figs. 3 and 4 are detailed views, with the plate in Fig. 3 provided with pointed studs or projections, and in Fig. 4 without these.

This invention relates to improvements in nut-locks specially adapted for railroad-rails, though applicable for use wherever bolts are employed.

The object of my invention is to lock the nut upon its bolt as against working loose or off when exposed to a jarring action or concussion; and the nature of my invention consists of a plate stamped or formed with a V-shaped notch in its bent-over portion, whereby the nut can be locked at an eighth of a turn, and thus reduce the possible play of the nut upon its bolt to a minimum, and having one or more of its corners bent to form holding points or projections, substantially as hereinafter more fully set forth.

In the accompanying drawings, A marks a railroad-rail sandwiched between the fish-plates B B, in the usual way. C is a bolt securing these parts together, and itself held in place by a nut, *a*.

D is the locking-plate, with a hole through it to permit it to be placed upon the bolt C, as clearly seen in several of the figures. It is inserted between one of the fish-plates and the nut *a* of the bolt, as fully shown. This plate is formed or stamped with a V-shaped notch, E, in its edge, (preferably its upper edge,) and after the nut is screwed home it will be seen that, whether it presents one side parallel with the plane of the upper slotted edge of the plate or one corner thereto, by simply bending the slotted edge of the plate down, the nut will be locked in position upon its screw or bolt. The notch receives the corner edge of the nut should this be presented. By this arrangement it will be observed that the nut will be intercepted by the locking-plate at the eighth of a turn, or at a less extent of turn than heretofore attained, whereby the nut can be secured with the least possible play upon its bolt.

The locking-plate has one or more of its corners, *b*, bent to form points or projections, which, upon pressure, embed themselves into the ordinary wooden fish-plates, to prevent said locking-plate from turning in any direction.

Having thus fully described my invention, I claim and desire to secure by Letters Patent—

The plate D, having lips *b*, recess E, and perforations to receive bolt C, and adapted to be bent upon itself, as shown, in combination with said bolt C, fish-plates B, rail A, and nut *a*, as and for the purposes set forth.

In testimony that I claim the foregoing I have hereunto set my hand and seal this 31st day of August, 1880.

SAMUEL S. SMITH. [L. S.]

Witnesses:
MILTON B. PLUMMER,
A. B. OEKIMAN.